(12) United States Patent
Fauveau

(10) Patent No.: US 7,334,451 B1
(45) Date of Patent: Feb. 26, 2008

(54) LEVEL METER THRESHOLD DETECTION SYSTEM

(75) Inventor: Eric Fauveau, Baton Rouge, LA (US)

(73) Assignee: K-Tek Corporation, Prairieville, LA (US)

( * ) Notice: Subject to any disclaimer, the term of this patent is extended or adjusted under 35 U.S.C. 154(b) by 329 days.

(21) Appl. No.: 11/133,865

(22) Filed: May 20, 2005

(51) Int. Cl.
*G01F 19/00* (2006.01)
(52) U.S. Cl. ............................................ 73/1.73
(58) Field of Classification Search ............... None
See application file for complete search history.

(56) References Cited

U.S. PATENT DOCUMENTS 6,445,192 B1 * 9/2002 Lovegren et al. ........... 324/644

\* cited by examiner

*Primary Examiner*—Robert Raevis
(74) *Attorney, Agent, or Firm*—Jones, Walker, Waechter, Poitevent, Carrere & Denegre, L.L.P.

(57) ABSTRACT

The invention is a method to detect a weak interface signal in a guided wave level measurement device. The device includes a waveguide, a signal generator and a signal receiver, the signal generator and signal receiver being operationally connected to the waveguide. The method includes the steps of transmitting an outgoing signal; monitoring the signal received at the signal receiver to detect a first signal level that exceeds or equals a first threshold level (TH1) and if such a signal level is detected, continue monitoring the received signal to detect a second signal level that exceeds or equals TH1. Finally, if a second signal level in excess of TH1 is detected, continue monitoring the received signal to detect a third signal level that exceeds or equals a second threshold level TH2.

16 Claims, 3 Drawing Sheets

LEVEL METER THRESHOLD DETECTION SYSTEM

FIELD OF THE INVENTION

The present invention relates to a system and method for monitoring fluid levels in containers, such as storage tanks, and more particularly, where more than one fluid is present in the tank, creating a fluid/fluid interface.

BACKGROUND OF THE INVENTION

Various devices have been conventionally employed to measure the level of a fluid or the interface levels between two mediums (such as oil/water). Generally, these devices consist of a sensor within a container, and means for sending data from the sensor to a location where it would be detected and converted into a usable format representative of the level of fluid within the container. One common device is a time domain reflectometry device having a waveguide positioned in the tank (or a side chamber) and a signal generator and signal receiver. The device generates an electromagnetic signal which propagates down the waveguide. Upon reaching a fluid interface of fluids having differing dielectric constants, a portion of the signal is reflected from the interface and portion is transmitted through the interface and continues down the waveguide. The reflected signals are received, and from these reflected signals, the reflected times can be used to calculate fluid levels and interface relationships, all as well known in the art.

In containers having three fluids, such as air/oil and oil/water, it is desirable to track each interface to be able to calculate the volume of the fluids stored in the container. Each interface will create a reflected signal, provided the dielectric constants of each fluid are sufficiently different to create a contrast at the interface strong enough to produce a reasonable strength reflected signal. Even with a strong reflection at the first interface, a portion of the signal is transmitted through the interface, and continues traveling through the tank to the second interface. Again, if the dielectric constants of the second and third layers are sufficiently different, a reflected signal will be created at the interface. It is desired that the dielectric constants of the upper products be less than that of the lower products, and it is preferred that the difference in dielectric constants be greater than 10. Preferred ranges are as follows: generally, if a gas fluid such as air is the first layer, the dielectric constant will be about 1.0; the second fluid dielectric constant preferred range is 1.3 and 5.0; while the third fluid layer should have a dielectric constant of about greater than or equal to 15. Such ranges will generally produce readily detectable reflections at the air/liquid 1 and liquid 1/liquid 2 interfaces and the air/liquid 1 reflected signal will be of smaller amplitude than that from the liquid 1/liquid 2 interface.

In such a system, detection of a returned signal requires detection of the reflected signal and clocking the time (either absolute time (time from a fixed starting point, such as emission time) or differential time (time between reflected signals)). Due to noise present in the system, detection of a reflected signal generally requires detection of a signal having an amplitude or signal strength that exceeds a threshold value. When two reflections are expected, two different threshold values are preferred to account for the differences in the signal strengths of the reflections. As indicated above, the reflection from the liquid 1/liquid 2 interface is anticipated to be of greater strength than that from the air/liquid 1 interface, and hence the threshold 1 (air/liquid 1) is set at less that threshold 2 (liquid 1/liquid 2). In general, the air or gas/liquid interface references the "total level" in the tank.

Even when the stored products have suitable dielectric constants, the liquid/liquid interface may not be crisp or well defined due to interaction between the two liquids. For instance, in a container having an oil layer floating on a water layer, the oil/water interface may be diffuse due to mixing or the presence of an emulsion layer. Such a diffuse interface layer creates a weak return signal. For instance, the top of the emulsion layer may be detected as liquid/liquid interface, or conversely, an emulsion layer may prevent the creation of a sufficient reflected signal. A signal may not be reflected at the emulsion interface as the dielectric change through the emulsion layer is insufficient to create a strong reflected signal because the dielectric change is spread out instead of being localized. It is desirable to be able to detect the potential presence of the emulsion layer as an indicator that the level reading may be compromised.

SUMMARY OF THE INVENTION

The present invention is a method of detecting a weak interface signal in a guided wave device. The method seeks a liquid/liquid interface signal by searching for a signal level above a first "strong" interface signal threshold, and secondly, searching for a "weak" interface signal threshold. The step of seeking the weak interface signal can be eliminated if a strong interface signal is detected.

OBJECTS OF THE INVENTION

It is an object of the invention to provide a means for detecting a weak interface signal in a guided wave level measurement device.

It is an object of the invention to detect the presence of an emulsion layer at an interface using a guided wave level measurement device.

DESCRIPTION OF THE PREFERRED EMBODIMENT

Figure 1:
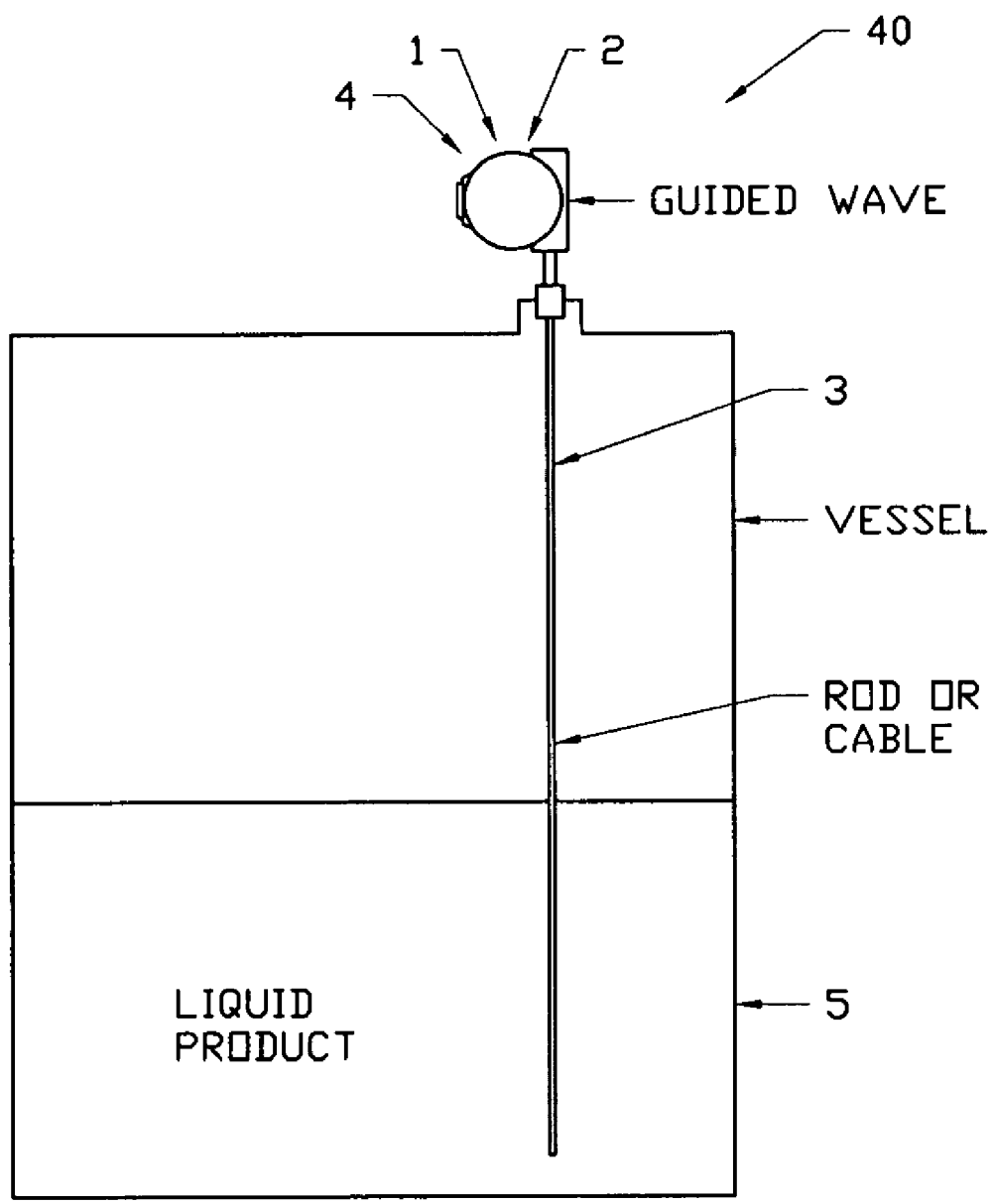
FIG. 1 is a schematic of a guided wave radar level measurement device in a tank with a single interface.
Figure 2:
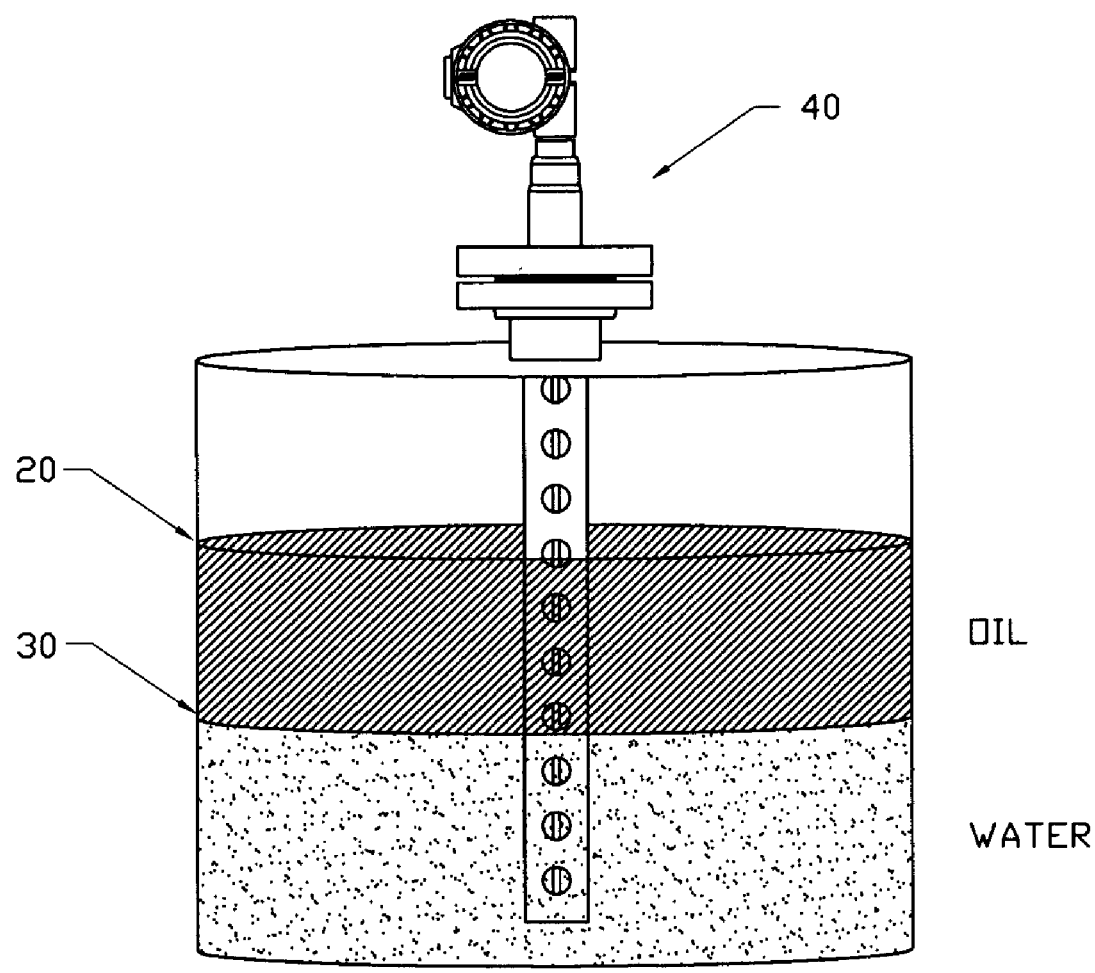
FIG. 2 is a schematic of a guide wave radar device placed in a tank with two interfaces.

The invention is a method of detecting and the presence of an unexpectedly weak reflected signal from a liquid/liquid interface, using a basic guided wave device as the level measurement device. The basic guided wave device 40 is shown in FIG. 1 disposed in a tank 5, although this system may also be deployed in an external chamber fluidly connected to the tank (not shown). The basic guided wave device includes a signal generator/emitter 1 and a signal receiver 2 (the emitter and receiver may be integrated into a single unit as depicted in FIG. 1) and a waveguide 3 operationally connected to the emitter 1 and receiver 2. The waveguide 3 may be constructed from flexible cable(s), or solid rod(s) or coaxial probe or other suitable construction known in the art. The waveguide may be positioned in the interior of the tank or storage chamber, or in a stilling well, displacer or an external chamber (all such being fluidly connected to the interior of the tank or storage chamber). The guided wave device will either include or work in conjunction with a processor 4 to track and compare time of emission and time of reception (or accumulated time beginning at time of emission and ending at time of signal reception). The processor 4 may be located on the device or in a remote location. As shown in FIG. 1, the processor 4 is located on the measurement device but external to the tank or vessel 5. Associated with the processor is a memory used to store values or constants (such as expected dielectric constants, time offsets, calibration values, threshold values) for use by the measurement system. Memory may also be used to store the received signals. The guided wave device may also include electronic hardware or software to process or condition the outgoing signal and/or incoming reflection signal, such as to remove ghosts or false echoes or other artifacts, to shorten the outgoing signal length, to blank or zero portions of the received signal, or other desired characteristics. Blanking of the return signal may be performed to disregard the reflection generated by the physical connection at the waveguide (the fiducial pulse). "Blanking" can be implemented by setting the values of the signal to a predetermined value indicative of blanking (such as "−9999") until a chosen time (e.g. BLK=A) or simply by not examining values of the signal until the time equals or exceeds the blanking time (A). Alternatively, some systems use this fiducial pulse as a start of timing. See U.S. Pat. No. 6,535,161. Shown in FIG. 2 is the level measuring device located in a tank having an air/liquid interface 20 and a liquid/liquid interface 30.

The electromagnetic wave propagates through the products and is partially reflected at a product interface, with the reflected wave back propagated to the receiver. The system uses the principle of time domain reflectometry to determine product levels. The system measures the time between the emitted pulse and received pulse (time of flight) and converts the time of flight to a distance measurement by using the signal propagation velocity. The electromagnetic signal propagates at the speed of light in the product layers, but that velocity will vary in each fluid type. The propagation velocity in a particular fluid is inversely proportional to the square root of the dielectric constant of that fluid. Hence, the system must store propagation velocities or dielectric constants to be able to properly compute product levels. The system may send thousands of transmit pulses and integrating the time sampled received pulses to arrive at a more robust measurement. The basic guided wave devices are known in the art and will not be further described.

Figure 3:
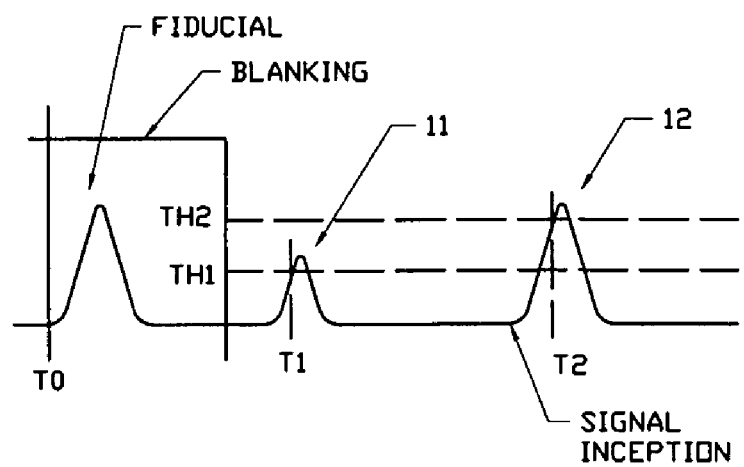
FIG. 3 is a schematic of a received signal showing reflections for the interfaces the embodiment of FIG. 2 deployed in an external chamber.

A representative time signal in an air/oil/water layered system is shown in FIG. 3. Shown is the emitted pulse 10 emitted at time T0, the air/oil reflected pulse 11 (the total volume reflection) received at time T1, and the oil/water reflected pulse 12 received at time T2. Note the amplitude of the oil/water interface reflection 12 is larger than that of the air/oil reflected signal 11. This is due to the fact that the water/oil interface typically presents a much stronger reflector than the air/oil interface. Also shown are thresholds TH1 and TH2. The system detects the total volume reflection when that signal crosses the threshold level TH1, and also detects the water/oil reflection when that signal crosses the threshold level TH2. The system determines a time of flight for these two signals and from the time of flight and the propagation velocity, calculates product levels. Propagation velocity (as well as dielectric constant) as can be determined from calibration measurements or can be determined based upon dielectric constants of the liquids in the tank (if known beforehand). In one analog embodiment, the return signal is on a baseline of −2 volts and the TH1 value is −1.8 volts, and TH2 value is −0.8 volts. In another digital embodiment, the baseline signal is 0 volts, and TH1 is set at 0.2 volts and TH2 to 0.7 volts. These numbers are only stated as examples and other values could be monitored.

Obviously, to determine the distance from the measured time, dielectric constant or propagation velocity is needed. If this is not known prior to installation, a controlled environment can be established in the tank or chamber with known product levels, and based upon the known levels and received time signals, the dielectric constants and/or propagation velocity can be calculated and stored for future reference. In general, the dielectric constant of the lowest product layer is not needed.

As in other wave guided level measurement systems, there are certain levels at the top and bottom of the tank or chamber that are not measurable. For instance, the waveguide will generally not touch to tank bottom, and hence, levels below the waveguide are not detectable (for true level measurement, this bottom offset value must be accounted for in calculating levels; the offset level can be stored and applied to the calculated measurement). Also, a zone at the top of the tank (typically 0-4 inches) is considered unmeasurable or having unreliable measurements.

Figure 4:
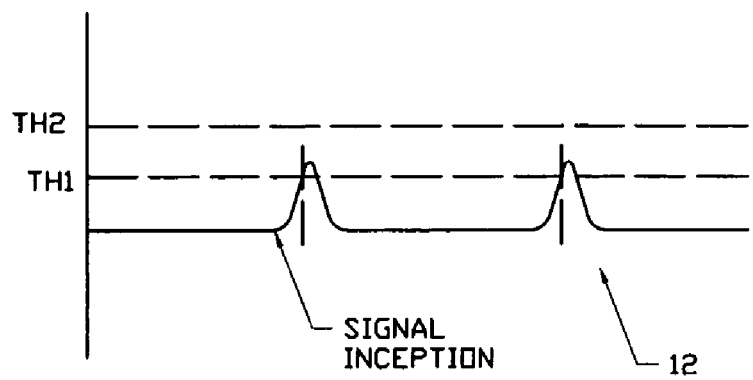
FIG. 4 is a schematic of a received signal where the weak interface signal is received from the liquid/liquid interface.
Figure 5:
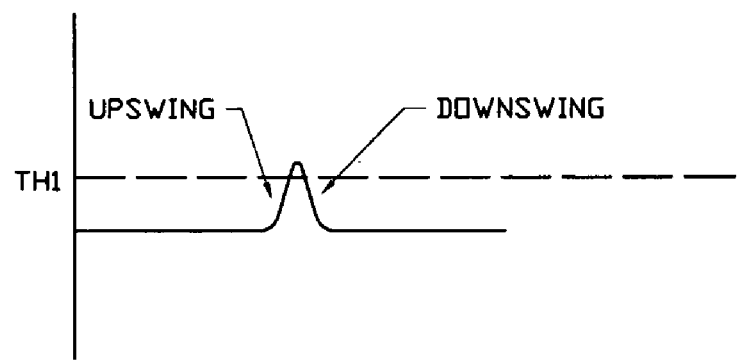
FIG. 5 is a schematic reflected pulse showing the upswing and downswing crossing of thresholds.

Timing must be accounted for when monitoring for signal crossings, since two different threshold levels will lead to two different measured time. The preferred embodiment uses upswing crossing detection, but obviously, different means of measuring amplitude may be used for locating the reflected signals. Also, if a reflected pulse echo crosses TH1 (on the upswing), then another crossing of TH1 will generally occur on the downswing of the same reflected pulse (See FIG. 5). Hence, when detecting a first crossing of TH1, the system may delay (for a predetermined period of time) searching for a second crossing of TH1 to account for the pulse width following the first TH1 (alternatively, the system could monitor the slopes and ignore a second crossing if the slope is negative (assuming a positive pulse waveform as shown in FIGS. 3-5)), When searching for the liquid/liquid interface, there does not need to be a delay in searching for the crossing when using the TH2 threshold (TH2 being such that it's value is greater than the amplitude of the total level reflection). The pulse width delay is considered a time period "Delta."

Shown in FIG. 4 is a representative time signal from the same layered system as in FIG. 3, but now with an emulsion layer separating the oil/water layers. Note that the oil/water reflected signal 12 is smaller that that shown in FIG. 3, and indeed, as shown in FIG. 4, this pulse falls below threshold TH2. In the usual interface detection method, no interface would be found as the applicable threshold TH2 is not crossed. However, in the present system, the presence of a weak return signal is detected and used as an indicator of an emulsion or rag layer. In the following description, the system uses a single pass of a signal to track threshold crossings. Other embodiments using multiple passes are also possible. In the single pass embodiment (suitable for digital devices where the received signal is stored as a sampled signal) the system tracks the return signal for a first occurrence of a TH1 crossing, (used to determine the total level) and for a second crossing of threshold 1 (TH1), and stores that time. The system also tracks return signal for a crossing of TH2 within a designated time window after detecting the first TH1 crossing (the window is to ensure that a second crossing is not attributable to a newly emitted signal, that is, the window should be sufficient to allow the system to measure fluid levels near the distal end of the probe. Lacking a TH2 crossing within the time window, the system flags the received signal as a weak interface signal. If a suitable crossing of TH2 is found within the designated window, the second time crossing of TH1 is ignored, and the system calculates level on the basis of the TH2 crossing, including application of suitable bias (such as about ¾ of an inch). If the system flags the signal as a weak interface signal, the distance to that level may be calculated, but an indication of a weak signal may be provided. By providing for an indication of weak interface signal, the operator can determine what action, if any, needs to be taken. The indication may be an alarm, a visual indicator, an indication of the actual signal strength received or other indication means. The indication means may be located with the measurement system (such as mounted on the system electronics) or located remote from the level measurement device. If the system detects no second TH1 crossing for the liquid/liquid layer, the system has failed to detect the liquid/liquid interface. In this event, the system may also provide an indication of no liquid/liquid level, such as an alarm, visual indicator or other type of indication means.

It is preferred that the threshold levels be settable, and the delays also be settable. This can be accomplished at the factory, or the user may modify these constants in the field by changing the values stored in the system memory. Obviously, the decision logic and values used for detection of threshold levels could be hardwired without using a processor or memory, but such is not preferred.

The system could be designed with multiple thresholds, for instance TH1 for the first interface, TH3 for a weak second interface signal, and TH2 for a strong second interface signal. For systems that detect the fiducial pulse (instead of blanking such), the search for a return signal would require a delay to ensure that the first signal is an interface signal, and not the fiducial. Alternatively, a fiducial threshold could be utilized THF.

As described above, the detection requires only a single return signal (a single pass embodiment) to determine if the received reflected (or returned) signal(s) meets or exceeds all relevant thresholds. Multiple pass embodiments are also possible. For instance, one multiple pass embodiment uses four passes (either four passes of a single return signal or a pass through four different return signals) and a single threshold value (THV) that is modified as needed from pass to pass. For instance, in a first pass the system is set to looks for the initial gas/fluid interface or the total fluid level, and THV is set equal to TH1. The system can ignore the initial portion of the return signal containing the fiducial if desired, for instance by setting blanking to a time that exceeds the expected fiducial pulse arrival time, say BLK=FID. Upon detection of a signal level that equals or exceeds TH1, at time T1, the total level is determined. On the second pass, the system again is set to ignores the initial portion (e.g. BLK=FID, or alternatively, blanking could be set to "T1+Delta") and THV is set to TH2, the strong interface signal threshold, and the system searches for the strong liquid/liquid return signal (which may or may not be found). Pass three, again searches for a received reflected signal level that equals or exceeds the total level threshold; (e.g., BLK=FID; THV=TH1). Pass 4 depends on the outcome of pass 2. If no threshold intercept or crossing of THV=TH2 is found during pass 2, then no strong interface signal was detected. In this instance, a pass 4 is needed and THV=the weak interface signal threshold, (e.g. TH1) and the initial portion of the return signal (including the total level time T1) is ignored, (e.g. BLK=T1+Delta if blanking is used). That is, the system is searching the received reflected signal for the weak interface level as an emulsified layer (again, which may or may not be present). After pass 4 (if undertaken), the system would the repeat the process, beginning again at pass 1.

Obviously, the order of the passes could be modified, or a three pass process used (pass 1, search for the return signal for total level; pass 2, search the return signal for strong interface, pass 3, search the return signal for weak interface past total level, if needed). Also a two pass embodiment is possible (pass 1 search the return signal for total level; pass 2 search for both thresholds, the weak and strong interface return signal beyond total level threshold). As described above, each "pass" refers to searching for threshold levels on distinct return signals. In a digital environment, a "pass" can refer to a scan of one recorded return signal, and hence, several "passes" could be made on the same recorded signal. Additionally, the "order" of the passes could be modified, for instance, instead of finding total level first, the stronger liquid/liquid interface could be initially sought before seeking total level.

Although the present invention has been described in terms of specific embodiments, it is anticipated that alterations and modifications thereof will no doubt become apparent to those skilled in the art which are intended to be included within the scope of the following claims. For instance, the system, with suitable selection of thresholds and delays, could be adjusted to measure additional interfaces within a container.

The invention claimed is:

1. A method of detecting a weak interface signal in a guided wave level measurement device comprising a waveguide, a signal generator and a signal receiver, the signal generator and signal receiver operationally connected to the waveguide, said device emitting signals from said signal generator to be received as reflected signals at said signal receiver, wherein the method comprises the steps of
   (a) monitoring one of said received reflected signals (S1) to detect a first signal level that exceeds or equals a first predetermined threshold level (TH1) and detecting said first signal level at elapsed signal time T1;
   (b) monitoring one of said received reflected signals (S2) to detect a second signal level that exceeds or equals a second predetermined threshold level (TH2), where TH2 equals or exceeds said TH1;
   (c) monitoring one of said received reflected signals (S3) to detect a third signal level that equals or exceeds a third signal threshold level (TH3) where TH3 is less than TH2;
   (d) if detection is made of said signal levels at TH3 but not TH2, transmitting an indicator of failure to detect, in said received reflected signals, said second signal levels.

2. The method of claim 1 wherein said received reflected signal S1 is the same signal as said received reflected signal S2.

3. The method of claim 1 wherein said received reflected signal S2 is the same signal as said received reflected signal S3.

4. The method of claim 1 wherein said received reflected signal S1 is the same signal as said received reflected signal S3.

5. The method of claim 1 wherein said received reflected signals S1, S2 and S3 are the same signal.

6. The method of claim 1 wherein said received reflected signals S1, S2 and S3 are each different signals.

7. The method of claim 1 wherein said TH3 equals TH1.

8. The method of claim 1 wherein said step of monitoring said received reflected signal S3 for a signal level above TH3 occurs after said elapsed signal time T1 plus a predetermined time.

9. The method of claim 1 wherein said received reflected signal S1 is not monitored for a predetermined elapsed signal time.

10. The method of claim 1 wherein said received reflected signal S1 has values, and said values are reset to a predetermined level for a predetermined signal elapsed time.

11. The method of claim 1 wherein any two of said received reflected signals S1, S2 and S3 are different signals.

12. The method of claim 1 wherein said step of transmitting an indicator of failure to detect a signal level at TH2 comprises transmitting to an indication means located remote from said device.

13. The method of claim 1 wherein said step of monitoring said received reflected signal S2 for signal level above TH2 occurs after said elapsed signal time T1 plus a predetermined time.

14. The method of claim 1 wherein said step of transmitting said indicator of failure comprises transmitting a visual indicator or an alarm.

15. The method of claim 1 wherein none of said thresholds TH1, TH2 or TH3 reflect a fiducial signal level threshold.

16. A method of detecting a weak interface signal in a guided wave level measurement device comprising a waveguide, a signal generator and a signal receiver, the signal generator and signal receiver operationally connected to the waveguide, said device emitting signals from said signal generator to be received as reflected signals at said signal receiver, wherein the method comprises the steps of (a) monitoring one of said received reflected signals (S1) to detect a first signal level that exceeds or equals a first predetermined threshold level (TH1) and detecting said first signal level at elapsed signal time T1;

(b) monitoring one of said received reflected signals (S2) to detect a second signal level that exceeds or equals a second predetermined threshold level (TH2), where TH2 equals or exceeds said TH1;

(c) if no second signal level equal or exceeding said TH2 is detected, monitoring one of said received reflected signals (S3) to detect a third signal level that equals or exceeds a third signal threshold level (TH3), where TH3 is less than TH2, and if said signal level at or above TH3 is detected, transmitting an indicator of failure to detect said second signal level.

* * * * *